(12) United States Patent
Zumach et al.

(10) Patent No.: US 11,599,501 B2
(45) Date of Patent: Mar. 7, 2023

(54) METHODS FOR FACILITATING EFFICIENT ANALYSIS OF TIME-BASED FILE SYSTEM PROPERTIES USING HISTOGRAMS AND DEVICES THEREOF

(71) Applicant: NetApp, Inc., Sunnyvale, CA (US)

(72) Inventors: Bill Zumach, Pittsburgh, PA (US); Keith Bare, Pittsburgh, PA (US); Xin Wang, Sewickley, PA (US)

(73) Assignee: NETAPP, INC., San Jose, CA (US)

( * ) Notice: Subject to any disclaimer, the term of this patent is extended or adjusted under 35 U.S.C. 154(b) by 58 days.

(21) Appl. No.: 17/217,485

(22) Filed: Mar. 30, 2021

(65) Prior Publication Data
US 2022/0318191 A1 Oct. 6, 2022

(51) Int. Cl.
*G06F 16/00* (2019.01)
*G06F 16/14* (2019.01)
*G06F 16/13* (2019.01)

(52) U.S. Cl.
CPC .............. *G06F 16/14* (2019.01); *G06F 16/13* (2019.01)

(58) Field of Classification Search
CPC ................................. G06F 16/14; G06F 16/13
USPC .................................................. 707/600–899
See application file for complete search history.

(56) References Cited

U.S. PATENT DOCUMENTS

| | | | |
|---|---|---|---|
| 10,733,105 B1* | 8/2020 | Visvanathan | G06F 3/0611 |
| 10,936,538 B1* | 3/2021 | Unger | G06F 16/11 |
| 2011/0276656 A1* | 11/2011 | Knapp | G06F 16/10 709/219 |
| 2016/0371296 A1* | 12/2016 | Passey | G06F 16/185 |
| 2017/0060667 A1* | 3/2017 | Chandraiah setty Narasingarayanapeta | G06F 16/219 |
| 2017/0063767 A1* | 3/2017 | Lukas | G06F 3/0488 |
| 2020/0218614 A1* | 7/2020 | Adduri | G06F 16/128 |
| 2020/0242095 A1* | 7/2020 | Malik | G06F 16/245 |

\* cited by examiner

*Primary Examiner* — Michelle N Owyang
(74) *Attorney, Agent, or Firm* — Troutman Pepper Hamilton Sanders LLP (Rochester)

(57) ABSTRACT

Methods, non-transitory machine readable media, and computing devices that facilitate more efficient file system directory analytics are disclosed. With this technology, a bucket value is increased for one of a plurality of buckets in each of a plurality of histograms associated with a file system directory in a hierarchical directory tree after a storage operation creating a file in the file system directory. A time value is set for the file based on a time of the storage operation. The bucket value is adjusted responsive to subsequent storage operation(s) (e.g., read, write, or delete) associated with the file. The one of the buckets is identified after the subsequent storage operation(s) based on the time value. An interactive analytics interface is output that is configured to generate, using one or more of the histograms, historical activity associated with the file system directory responsive to a selection of the file system directory.

16 Claims, 8 Drawing Sheets

METHODS FOR FACILITATING EFFICIENT ANALYSIS OF TIME-BASED FILE SYSTEM PROPERTIES USING HISTOGRAMS AND DEVICES THEREOF

FIELD

This technology generally relates to data storage and, more particularly, to methods and devices for improved file system directory analytics using histograms in hierarchical directory tree data structures.

BACKGROUND

Tree data structures are commonly used by computing devices to maintain data having an associated hierarchical arrangement. In one exemplary deployment, information regarding a file system can be maintained in a branched tree structure, such as a network attached storage (NAS) directory tree with interior nodes corresponding to directories and leaf nodes corresponding to files and maintaining a collection of properties or values. In a NAS environment, many storage nodes can store portions of a distributed database that each maintain a portion of a distributed directory tree structure associated with the file system. Analytics software can then utilize the directory tree maintained in the distributed database to report on the file system.

For example, a directory tree can be used by administrators to determine which directories in the file system have not been accessed in a prior historical time period (e.g., the last year) in order to identify space that can be reclaimed via migration to an archival storage tier. In another example, administrators can use a directory tree to determine the directories of the file system for which there has been a significant amount of modification in a prior historical time period (e.g., the last week). However, access and modification queries, for example, currently take a significant amount of resources (e.g., time and processor cycles) to generate a responsive report.

In one particular example, a directory tree maintains information for two directories, D1 and D2. D1 has two files, one of which is one year old and the other of which is one week old. D2 has one file that is one month old. If an administrator requested a report of the oldest directory, the analytics software would select D1. If the year old file is deleted from D1, D2 would then contain the oldest file, but the analytics software would need to scan the directory tree to find the next oldest file as well as to update the age of D1 based on the remaining one week old file. In live deployments, each of the directories would typically have many subdirectories, requiring the scanning of the entirety of a relatively large directory tree.

Scanning a directory tree can result in a significant time delay in responding to analytics queries when static analytics methodologies are employed. In dynamic analytics environments in which data is continuously propagated up the directory tree, responsive analytics reports can be generated more quickly. However, scans of the directory tree to keep the directory tree up-to-date can be frequent, resulting in a significant load on the file system, particularly in environments with a significant number of deletions and/or file accesses. Accordingly, analytics reporting regarding file system modification and access, for example, is currently inefficient and resource-intensive, resulting in a significant performance burden on storage nodes.

DETAILED DESCRIPTION

Figure 1:
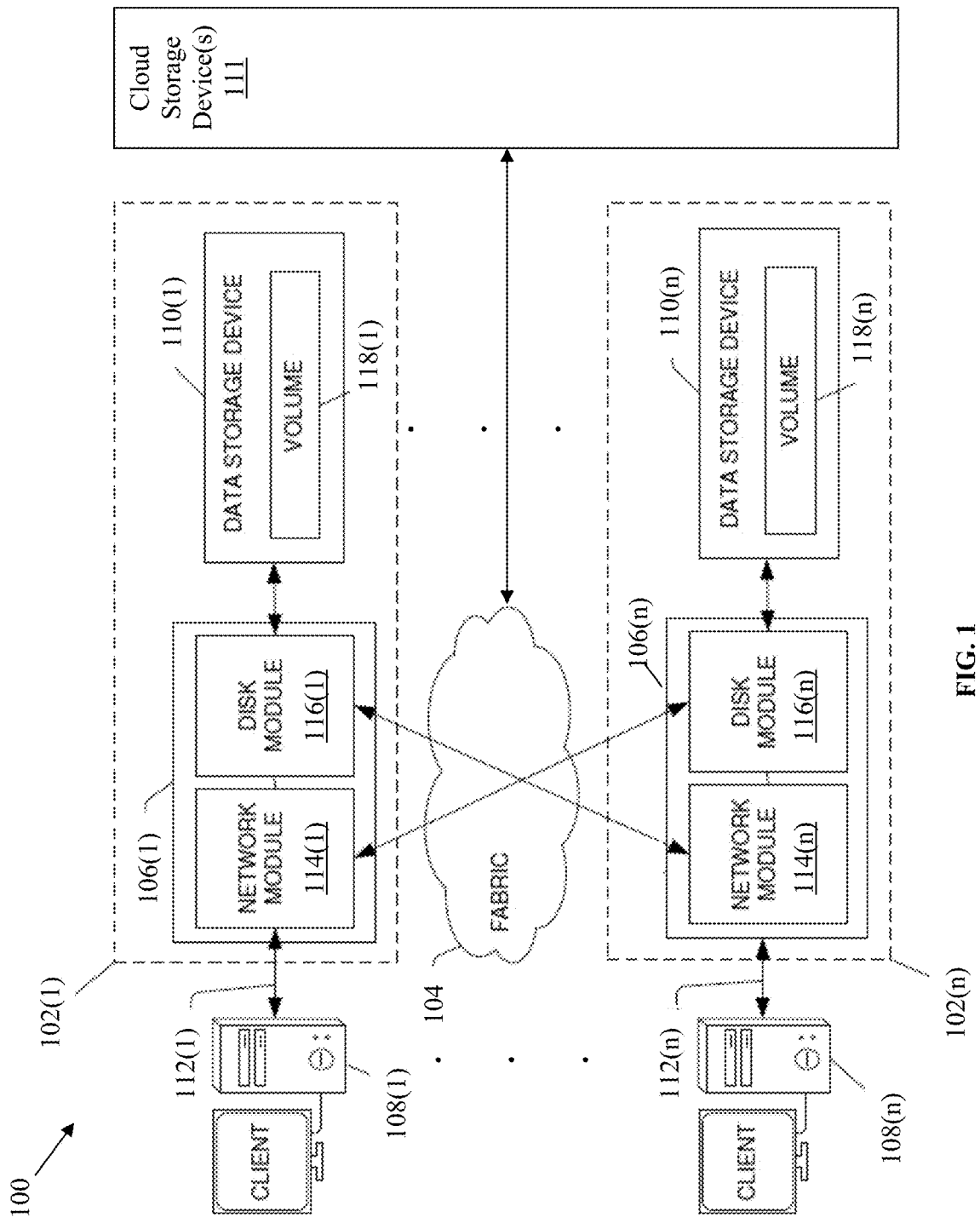
FIG. 1 is a block diagram of a network environment with exemplary data storage apparatuses.

A clustered, distributed network environment 100 that may implement one or more aspects of the technology described and illustrated herein is shown in FIG. 1. The network environment 100 includes data storage apparatuses 102(1)-102(n) that are coupled over a cluster fabric 104 that includes communication network(s) and facilitates communication between the data storage apparatuses 102(1)-102(n) (and one or more modules, components, etc. therein, such as, node computing devices 106(1)-106(n), for example), although any number of other elements or components can also be included in the clustered network environment 100 in other examples.

This technology provides a number of advantages including methods, non-transitory computer readable media, and computing devices that improve file system directory analytics using histograms in hierarchical directory tree data structures. This technology utilizes modification and access histograms of varying time period granularity for each directory in a directory tree, which are propagated upward to facilitate quicker analytics reporting. The histograms include buckets with values representing the amount (e.g., total file size) of files within a particular directory associated with the histograms that have been accessed or modified within the calendar time period corresponding to the buckets.

Leveraging the histograms, this technology does not require re-computing oldest or newest files, and thereby advantageously reduces overhead on the file system. For example, if a file is deleted, this technology only decreases a value in an appropriate bucket without requiring a rescan of the directory tree. Additionally, this technology generates near real-time graphical presentations of an entire file system with respect to historical access and modification. With the interactive graphical interfaces, administrators can efficiently drill down into the directory tree to find aged items of interest (e.g., oldest or newest file).

In the particular example described and illustrated herein with reference to FIG. 1, the node computing devices 106(1)-106(n) can be primary or local storage controllers or secondary or remote storage controllers that provide client devices 108(1)-108(n) with access to data stored within data storage devices 110(1)-110(n) and cloud storage device(s)

111. The data storage apparatuses 102(1)-102(n) and/or node computing devices 106(1)-106(n) of the examples described and illustrated herein are not limited to any particular geographic areas and can be clustered locally and/or remotely via a cloud network, or not clustered in other examples. Thus, in one example the data storage apparatuses 102(1)-102(n) and/or node computing device 106(1)-106(n) are distributed over a plurality of storage systems located in a plurality of geographic locations; while in another example a clustered network can include data storage apparatuses 102(1)-102(n) and/or node computing device 106(1)-106(n) residing in a same geographic location (e.g., in a single on-site rack).

In the illustrated example, one or more of the client devices 108(1)-108(n), which may be, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may run applications and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the requests to the client devices 108(1)-108(n) via the network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations and/or cloud storage (e.g., a storage endpoint stored within cloud storage device(s) 111), etc., for example. Such node computing devices 106(1)-106(n) can be attached to the cluster fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 108(n) with switchover data access to storage devices 110(n) in the event a disaster occurs at the second storage site hosting node computing device 106(n)). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks (i.e., cloud networks) embodied as Infiniband, Fibre Channel (FC), or Ethernet networks, for example, although other types of networks supporting other protocols can also be used.

Disk modules 116(1)-116(n) can be configured to connect data storage devices 110(1)-110(n), such as disks or arrays of disks, solid state drives (SSDs), flash memory, or another form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 118(1)-118(n) in this example, although any number of volumes can be included in the aggregates. The volumes 118(1)-118(n) are virtual data stores or storage objects that define an arrangement of storage and one or more file systems within the clustered network environment 100. Volumes 118(1)-118(n) can span a portion of a disk or other storage device, a collection of disks, or portions of disks, for example, and typically define an overall logical arrangement of data storage. In one example volumes 118(1)-118(n) can include stored user data as one or more files, blocks, or objects that reside in a hierarchical directory structure within the volumes 118(1)-118(n).

Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form clusters, among other functionality. Optionally, one or more of the volumes 118(1)-118(n) can be in composite aggregates and can extend between one or more of the data storage devices 110(1)-110(n) and one or more of the cloud storage device(s) 136 to provide tiered storage, for example, and other arrangements can also be used in other examples.

In one example, to facilitate access to data stored on the disks or other structures of the data storage devices 110(1)-110(n), a file system may be implemented that logically organizes the information as a hierarchical (e.g., tree) structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
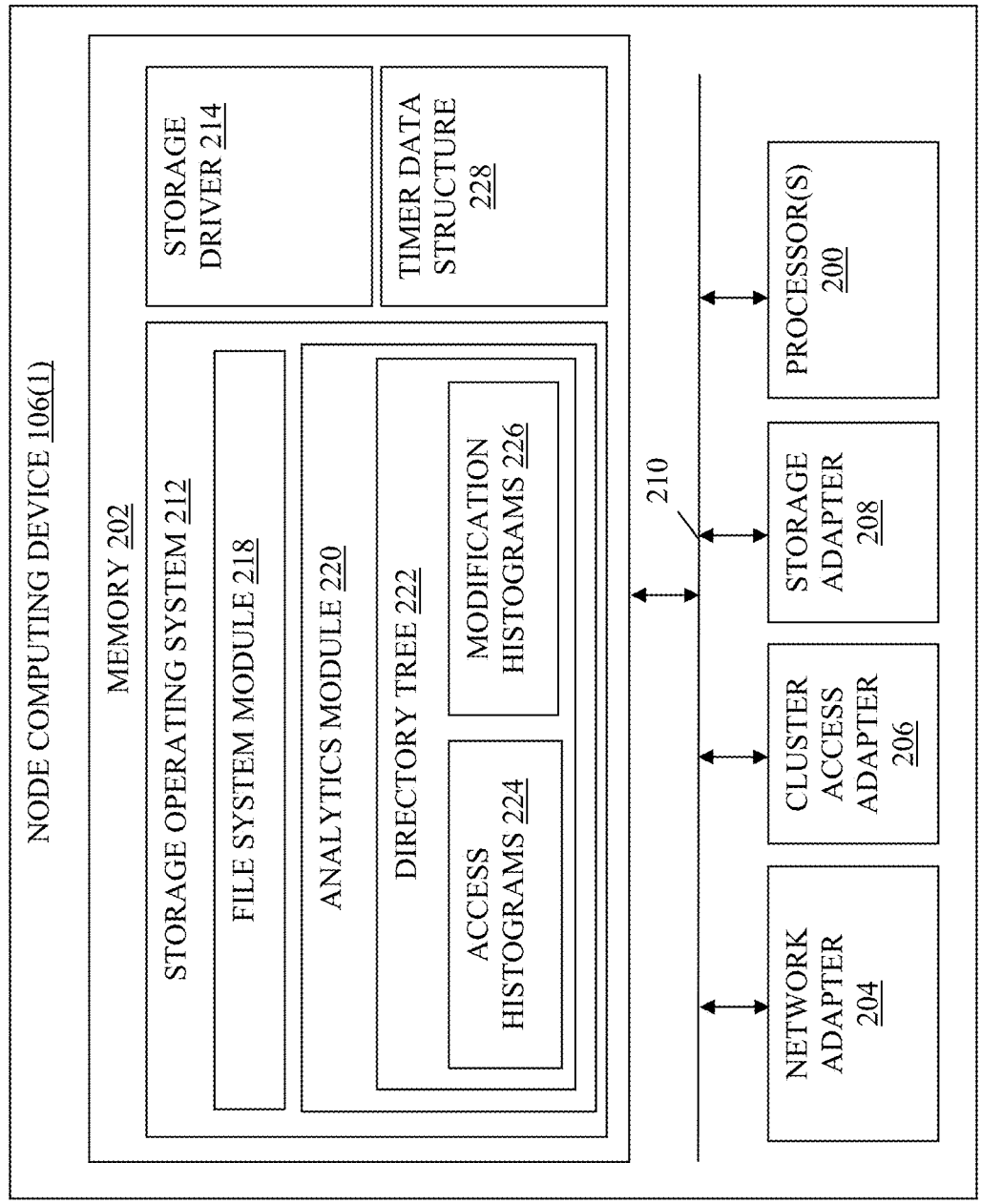
FIG. 2 is a block diagram of an exemplary node computing device of one of the data storage apparatuses of FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106(1) also includes a storage operating system 212 installed in the memory 202 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1).

The network adapter 204 in this example includes the mechanical, electrical and signaling circuitry needed to connect the node computing device 106(1) to one or more of the client devices 108(1)-108(n) over network connections 112(1)-112(n), which may comprise, among other things, a point-to-point connection or a shared medium, such as a LAN. In some examples, the network adapter 204 further communicates (e.g., using TCP/IP) via the cluster fabric 104 and/or another network (e.g. a WAN) (not shown) with cloud storage device(s) 111 to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include I/O interface circuitry that couples to the disks over an I/O interconnect arrangement, such as a SAN protocol. The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(n) and/or sent to another node computing device attached via the cluster fabric 104. In some examples, a storage driver 214 in the memory 202 interfaces with the storage adapter 208 to facilitate interactions with the data storage devices 110(1)-110(n).

The storage operating system 212 can also manage communications for the node computing device 106(1) among other devices that may be in a clustered network, such as attached to the cluster fabric 104. Thus, the node computing device 106(1) can respond to client device requests to manage data on one of the data storage devices 110(1)-110(n) or cloud storage device(s) 111 (e.g., or additional clustered devices) in accordance with the client device requests.

The file system module 218 of the storage operating system 212 can establish and manage one or more file systems including software code and data structures that implement a persistent hierarchical namespace of files and directories, for example. As an example, when a new data storage device (not shown) is added to a clustered network system, the file system module 218 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the memory 202 also includes an analytics module 220 that maintains a hierarchical directory tree 222. The directory tree 222 can be an indexed persistent store or an in-memory structure (e.g., a red/black tree or a hash table), and other types of storage structures can also be used depending on application requirements. The analytics module 220 continuously maintains information regarding the file system managed by the file system module 218 and hosted by the data storage devices 110(1)-110(n) and/or cloud storage device(s) 111. The directory tree 222 maintains recursive properties of files in the file system. Within the directory tree 222, interior nodes correspond to directories of the file system and leaf nodes correspond to files of the file system that are maintained in the directories.

In one particular example, the recursive properties include access and modification information for files and/or metadata associated with the files, although other types of information including creation information can also be used. In this example, parent interior nodes maintain information (e.g., total file size accessed or modified at particular historical time periods) for child interior nodes and associated directories and/or leaf nodes and associated files. The directory tree 222 maintains the recursive properties in access histograms 224 and modification histograms 226 for each directory and at each of the interior nodes, although other types of histograms (e.g., creation histograms) can be maintained in the directory tree 222 in other examples.

The access histograms 224 and modification histograms 226 each include a set of histograms, each of which includes a set of buckets, for each file system directory represented in the directory tree 222. Each set of histograms corresponds to a different time period granularity with each bucket corresponding to a different calendar or absolute time interval of the associated time period granularity. For example, the set of access histograms 224 can include week, month, quarter, and year histograms with the week histogram including a bucket for the "seventh week of 2021," the month histogram including a bucket for "March, 2021," the quarter histogram including a bucket for the "fourth quarter of 2020," and the year histogram including a bucket for "2020," for example. Accordingly, each of the histogram buckets corresponds with a fixed period of time or time interval.

Additionally, the week histogram is maintained for the current month, the month histogram is maintained for the current quarter, the quarter histogram is maintained for the current year, and the year histogram can be maintained for a selected number of years. Accordingly, the histograms can effectively be circular buffers whereby the oldest bucket value "ages out." Optionally, a bucket can be maintained in one or more of the histograms that represents an accumulation of all values older than the time period associated with the oldest bucket. For example, if the year histogram maintains four buckets for the current year and the prior three years, a fifth bucket for all data prior to three years ago can also be maintained.

The bucket value in each of the buckets in this example can be the total file size for files within the corresponding directory that were last accessed within the associated calendar time interval, although other file attributes can also be used. Accordingly, a 10 MB file in a directory that was last accessed two weeks ago would be represented by a 10 MB portion of the bucket value for the bucket corresponding to that week in one of the access histograms 224 for the directory that corresponds to week time intervals. Additionally, the file access would be represented by a 10 MB portion of the bucket value for the current or most recent bucket in ones of the access histograms 224 that correspond to month, quarter, and year time intervals in this example. In other examples, the number of blocks for the file, a count of a number of files, or any other count capable of being tallied can be used for the file attribute, and other types of bucket values and/or arrangements for the histograms can also be used in other examples.

The analytics module 220 is further configured to utilize the access histograms 224 and modification histograms 226 to generate interactive graphical reports and interfaces, respond to queries, and/or provide statistical information associated with the recursive properties. In some examples, the access histograms 224 and modification histograms 226 are maintained locally for those interior nodes (and directories) that are also maintained locally. In these examples, the directory tree 222 on node computing device 106(1) represents a portion of the hierarchical directory tree that is distributed across a plurality of the node computing devices 106(1)-106(n). The operation of the analytics module 220 is described and illustrated in more detail below with reference to FIGS. 3-8.

The examples of the technology described and illustrated herein may be embodied as one or more non-transitory computer or machine readable media, such as the memory 202, having machine or processor-executable instructions stored thereon for one or more aspects of the present technology, which when executed by processor(s), such as processor(s) 200, cause the processor(s) to carry out the steps necessary to implement the methods of this technology, as described and illustrated by way of the examples herein. In some examples, the executable instructions are configured to perform one or more steps of a method, such as one or more of the exemplary methods described and illustrated later with reference to FIGS. 3-8, for example.

Figure 3:
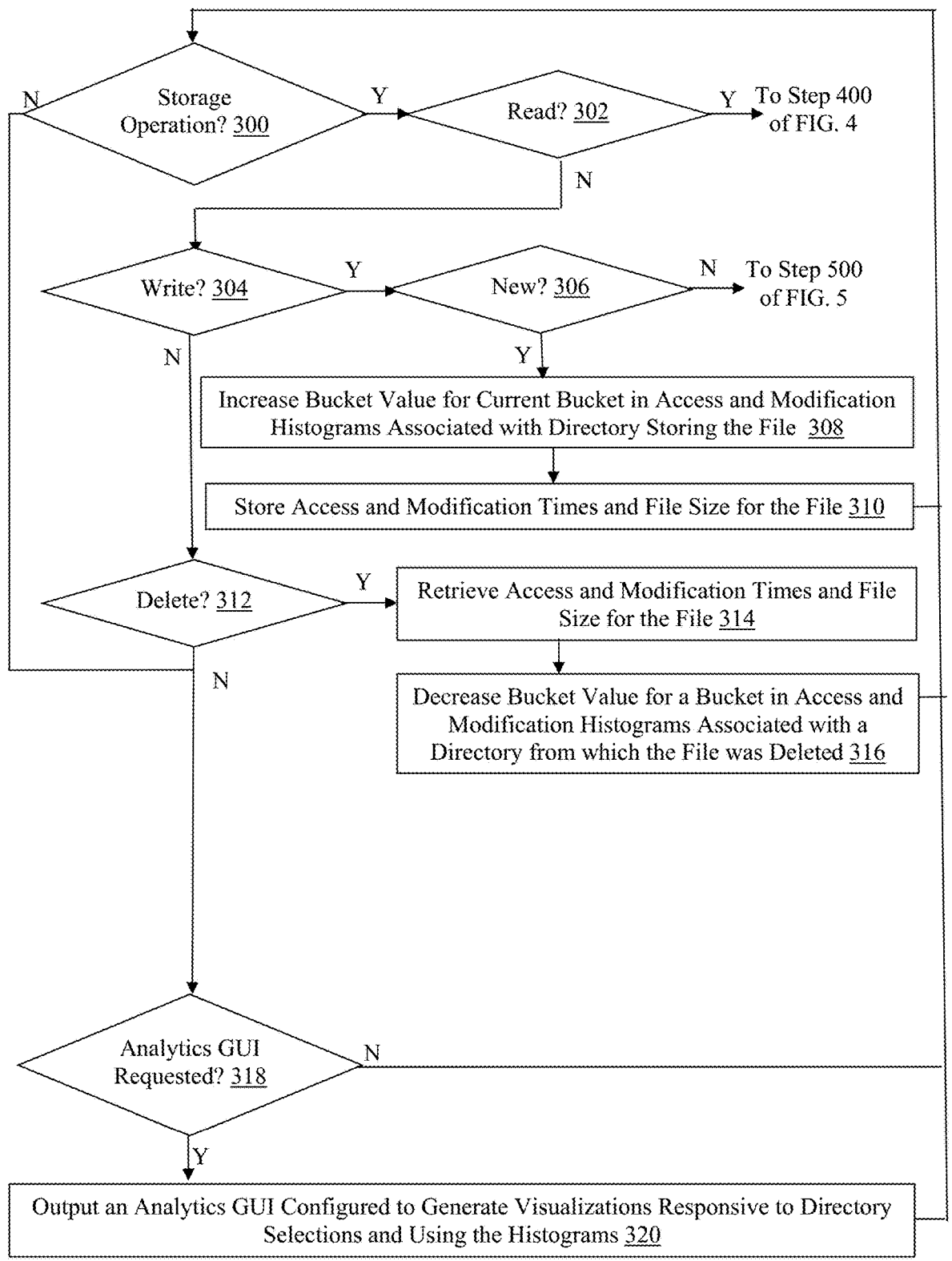
FIG. 3 is a flowchart of an exemplary method for facilitating file system analytics using histograms maintained in a directory tree.

Referring more specifically to FIG. 3, a flowchart of an exemplary method for facilitating file system analytics using the access histograms 224 and modification histograms 226 maintained in the directory tree 222 is illustrated. In step 300 in this example, the node computing device 106(1) determines whether a storage operation has been identified. The determination can be based on an implicit monitoring of communications from the client devices 108(1)-108(n) and/or an explicit communication from the file system module 220, for example, although any other method of determining that a storage operation has been received or initiated can also be used. If the node computing device 106(1) determines that a storage operation has been identified, then the Yes branch is taken to step 302.

In step 302, the node computing device 106(1) determines whether the storage operation is a request to read a file maintained in a directory within the file system. The determination of the type of storage operation can be based on metadata or a header associated with the storage operation, for example, although any other analysis or indicia that yields a type of the storage operation can also be used. If the node computing device 106(1) determines that the storage operation is a read request, then the Yes branch is taken to step 400 of FIG. 4.

Figure 4:
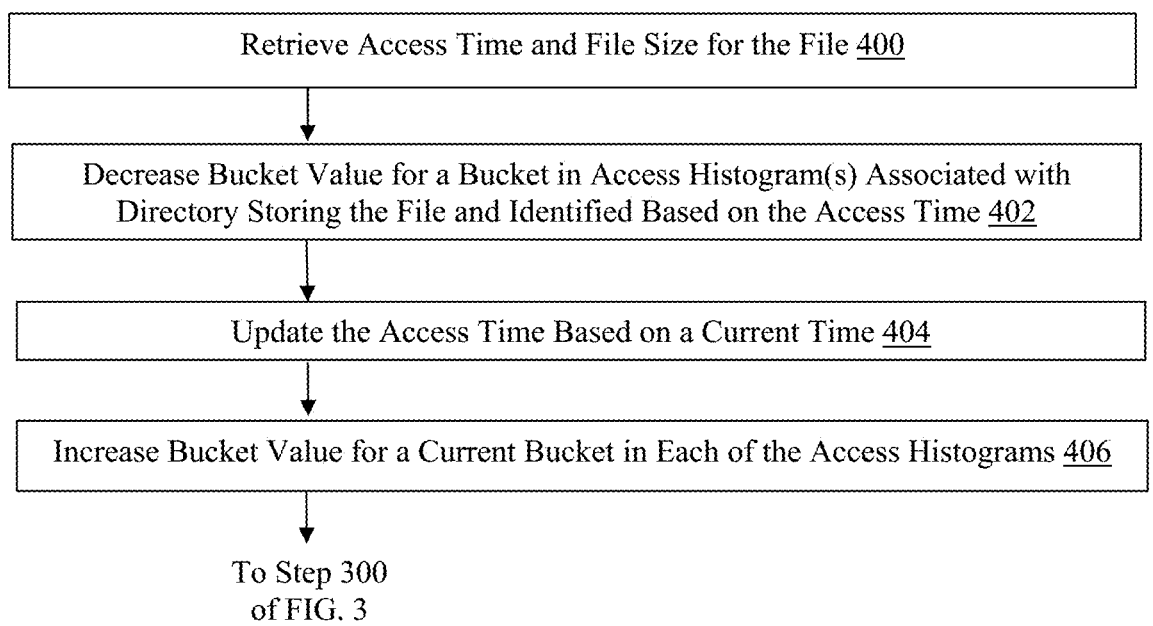
FIG. 4 is a flowchart of an exemplary method for maintaining access histograms in a directory tree responsive to read storage operations to facilitate efficient file system analytics.

Referring to FIG. 4, a flowchart of an exemplary method for maintaining the access histograms 224 in the directory tree 222 responsive to read storage operations to facilitate efficient file system analytics is illustrated. In step 400 in this example, the node computing device 106(1) retrieves a last access time and a file attribute for the file associated with the read request. The last access time can be a time of last access for the file, such as a calendar date having an associated week, month, quarter, and year, although any other level of granularity can also be used (e.g., hours, minutes, or seconds). While the last access time corresponds with access to files in the examples described and illustrated herein, the last access time could also correspond to metadata for the files in other examples, and times corresponding to other types of accesses can also be recorded and used in yet other examples. Additionally, the read request in this example is for file data, but could be for metadata associated with a file in other examples. The file attribute in the examples described and illustrated herein is a file size, such as the number of blocks or the physical space associated with storage of the file, although other types of file attributes, including a file count, can also be used in other examples. One or more of the last access time or file size can be maintained in the directory tree 222 or in other metadata for the file system maintained by the file system module 218, for example.

In step 402, the node computing device 106(1) decreases a bucket value for a bucket in at least one of the access histograms 224 associated with the directory storing the file. The bucket(s) are identified based on the last access time and the bucket values are decreased based on the file size. For example, if the last access time is Jul. 15, 2021 and the current date is Sep. 1, 2021, then the July, 2021, third quarter of 2021, and 2021 bucket values in three respective ones of the access histograms 224 (i.e., the month, quarter, and year access histograms) are decreased in examples described and illustrated above in which the access histograms 224 include week, month, quarter and year histograms for the most recent weeks, months, quarters, and years, respectively. The week one of the access histograms 224 is not decreased in this example because the last access time is more than one month prior to the current time, and therefore none of the bucket values in the week one of the access histograms 224 for the directory include or reflect the file size for the particular file associated with the read request.

However, in other examples, other histograms for weeks, months, quarters, and/or years that do not correspond to the most recent of those time intervals can be maintained. In these examples, the node computing device 106(1) determines whether the week one of the access histograms 224 includes a bucket corresponding to the last access time and, if it does not, an update is not made or a bucket representing an accumulation of all values older than the time period associated with the oldest week bucket is decreased, if such a bucket is being maintained In step 404, the node computing device 106(1), updates the last access time based on the current time or a time at which the read request was received. Accordingly, the node computing device 106(1) can replace (e.g., in metadata for the file) the last access time retrieved in step 400 with the time of the read request. Updating the last access time facilitates appropriate bucket value adjustments responsive to future storage operations associated with the file (e.g., a subsequent read request requiring execution of steps 400-402 by the node computing device 106(1)).

In step 406, the node computing device 106(1) increases a bucket value for a bucket in each of the access histograms 224 associated with the directory storing the file associated with the read request. Accordingly, in the above example, the current week, month, quarter, and year bucket values in the four respective ones of the access histograms 224 are increased by the file size for the file. In order to increase the current bucket values, the node computing device 106(1) first determines whether each of the four respective ones of the access histograms 224 has a bucket covering the time interval corresponding to the current time. If the current bucket exists for any of the histograms, then the bucket value is increased by the node computing device 106(1) for those histograms in step 406.

However, if the current bucket does not exist for at least one of the histograms, then the histograms is transformed in this example such that it has a valid current bucket. To facilitate the transformation, the node computing device 106(1) first determines whether any of the existing buckets in the histograms are too old in that they correspond to a time interval older than the time intervals that the histogram should be describing. For example, if the histograms is a month histogram, then the node computing device 106(1) determines whether any of the buckets are covering a time interval relating to a month that is more than two months prior to the current month in examples in which information on the current and two prior months is maintained in the month histogram.

If the node computing device 106(1) determines there is at least one bucket that is too old, then the bucket is either deleted along with the data stored therein or the data stored therein is added to a bucket value of a bucket representing periods of time older than the oldest bucket in the histogram in examples in which such an optional bucket is maintained. However, if the node computing device 106(1) determines that no buckets are too old, then a new current bucket is created that covers the time interval corresponding to the current time. Subsequent to creating the new bucket, the value of the new bucket is increased in step 406 based on the file size.

In other examples, buckets can be relabeled such that removing a bucket label is equivalent to deleting the bucket and setting a new label for an unlabeled bucket is equivalent to adding a bucket. Other methods by which the histograms are maintained and/or transformed can also be used. However, advantageously in the examples described and illustrated herein, a histograms can remain in a particular state indefinitely as long as there are not any changes made to the files or directories that the histogram describes that would require a histogram update, thereby minimizing extra work unrelated to the storage operations currently being serviced.

In other examples, bucket values are not decreased in step 402, or increased in step 406, for the current buckets in the access histograms 224 for the directory when the last access time falls within the time interval associated with the shortest of the time period granularities associated with the access histograms 224 (i.e. the current week in the example described and illustrated herein). The node computing device 106(1) can avoid adjusting the bucket values since the decrease and increase in the bucket values would be offsetting. Additionally, one or more of steps 402-406 can occur in parallel and/or in a different order in other examples. Subsequent to increasing the bucket values in step 406, the node computing device 106(1) proceeds back to step 300 in FIG. 3 in this example.

Referring back to FIG. 3, if the node computing device 106(1) determines in step 302 that the identified storage operation is not a read request, then the No branch is taken to step 304. In step 304, the node computing device 106(1) determines whether the storage operation is a write request, such as a request to write to or modify an existing file maintained in a directory of the file system or a request to write to or create a new file. If the node computing device 106(1) determines that the storage operation is a write request, then the Yes branch is taken to step 306.

In step 306, the node computing device 106(1) determines whether the write request is a request to write to an existing file or is a request to create a new file. If the node computing device determines that the write request is not a request to create a new file (i.e., the write request is a request to write to or modify an existing file), then the No branch is taken to step 500 of FIG. 5 in this example.

Figure 5:
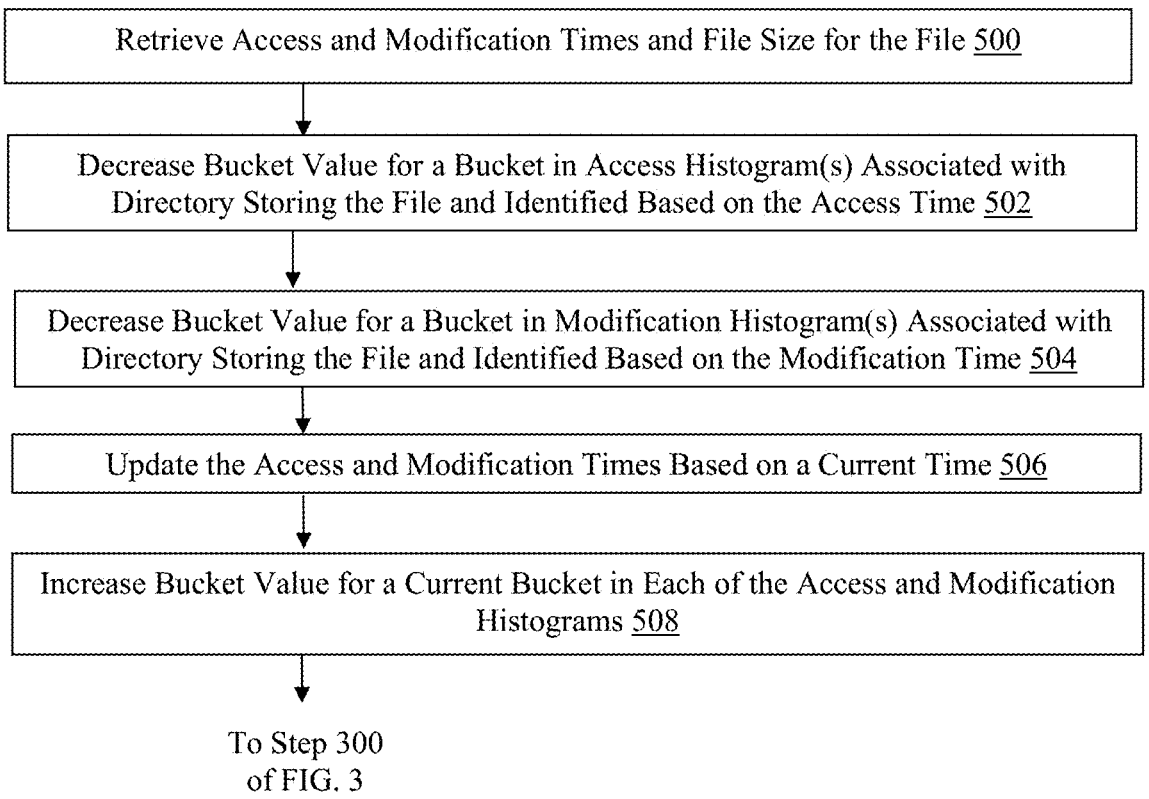
FIG. 5 is a flowchart of an exemplary method for maintaining access and modification histograms in a directory tree responsive to write storage operations to facilitate efficient file system analytics.

Referring to FIG. 5, a flowchart of an exemplary method for maintaining the access histograms 224 and modification histograms 226 in the directory tree 222 responsive to write storage operations to facilitate efficient file system analytics is illustrated. In step 500 in this example, the node computing device 106(1) retrieves a last access time, a last modification time, and a file attribute (e.g., file size) for the existing file prior to the modification of the file as a result of the write request, each of which can be maintained in metadata for the file, for example.

In step 502, the node computing device 106(1) decreases a bucket value for a bucket in one or more of the access histogram(s) 224 associated with the directory storing the file. The bucket(s) are identified based on the last access time retrieved in step 500, as described and illustrated in more detail above with reference to step 402 of FIG. 4, for example.

In step 504, the node computing device 106(1) also decreases a bucket value for a bucket in one or more of the modification histogram(s) 226 associated with the directory storing the file. The bucket(s) are identified based on the last modification time retrieved in step 500, also as described and illustrated in more detail above with reference to a last access time in step 402 of FIG. 4, for example.

In step 506, the node computing device 106(1) updates the access and last modification times in the metadata for the file based on a current time or a time at which the write request was identified or received. Optionally, the node computing device 106(1) also updates the file size to reflect the increased or decreased file size resulting from the write request. While the access and modification times correspond with access to files in the examples and described and illustrated herein, the access and/or modification times could also respond to metadata for the files in other examples, and times corresponding to other types of accesses can also be recorded and used in yet other examples. Additionally, the write request in this example is for file data, but could be for metadata associated with a file in other examples. While both the access and modification times and histograms are updated in the example, in other examples, only the modification time and modification histogram are updated responsive to a write storage operation.

In step 508, the node computing device 106(1) increases a bucket value for a current bucket in each of the access histograms 224 and modification histograms 226 based on the updated file size of the file resulting from the write request. The bucket values can be increased as described and illustrated in more detail above with reference to step 406 of FIG. 4. In particular, if a current bucket does not exist for one or more of the access histograms 224 and/or modification histograms 226, then the current bucket(s) are created, and the histogram(s) are transformed, as described and illustrated in more detail above.

Accordingly, after step 508, as a result of steps 502, 504, and 508, the appropriate bucket values are decreased by the file size prior to the write request and the appropriate bucket values also are increased by the file size subsequent to the write request. In other examples, one or more of steps 502-508 can be performed in parallel and/or in a different order. Subsequent to increasing the bucket values in step 508, the node computing device 106(1) proceeds back to step 300 of FIG. 3 in this example.

Referring back to FIG. 3, if the node computing device 106(1) determines in step 306 that the write request is a request to write or create a new file, then the Yes branch is taken to step 308. In step 308, the node computing device 106(1) increases a bucket value for a current bucket in each of the access histograms 224 and modification histograms 226 associated with the directory in which the new file is to be stored. The bucket values can be increased by the file size for the newly-created file or another file attribute. Additionally, the bucket values can be increased as described and illustrated in more detail above with reference to step 406 of FIG. 4. In particular, if a current bucket does not exist for one or more of the access histograms 224 and/or modification histograms 226, then the current bucket(s) are created, and the histogram(s) are transformed, as described and illustrated in more detail above.

In step 310, the node computing device 106(1) stores access and modification times in metadata for the newly-created file, for example, which can be used to appropriately identify bucket(s) in response to subsequent storage operations associated with the file. In other examples, the stored time value can be a creation time in addition to or in place of one or more of the access or modification times. In these examples, the node computing device 106(1) can store a creation histogram in the directory tree 222, and other types of histograms can also be used in other examples. Additionally, the node computing device 106(1) stores the file size for the newly-created file, which can be used to appropriately adjust bucket values for identified bucket(s) in response to subsequent storage operations associated with the file. While both the access and modification times and histograms are updated in the example, in other examples, only the modification time and modification histogram are updated responsive to a write storage operation. The node computing device 106(1) subsequently proceeds back to step 300 in this example.

However, if the node computing device 106(1) determines in step 304 that the identified storage operation is not a write request, then the No branch is taken to step 312. In step 312, the node computing device 106(1) determines whether the storage operation is a request to delete an existing file maintained in a directory of the file system. If the node computing device 106(1) determines that the storage operation is a request to delete a file, then the Yes branch is taken to step 314.

In step 314, the node computing device 106(1) retrieves access and last modification times and a file size for the file to be deleted as a result of the deletion request. The last access and modification times and/or file size can be retrieved from metadata maintained by the file system module 218 and/or could have been stored as described and illustrated above with reference to step 310, for example.

In step 316, the node computing device 106(1) decreases a bucket value for bucket(s) in the access histograms 224 and modification histograms 226 for the directory storing the file to be deleted. The bucket(s) can be identified based on the last access and modification times retrieved in step 314, and the bucket values can be decreased by the file size retrieved in step 314. The node computing device 106(1) subsequently proceeds back to step 300 in this example.

In parallel with processing storage operations as described and illustrated with reference to steps 300-316 of FIG. 3, steps 400-406 of FIG. 4, and steps 500-508 of FIG. 5, the node computing device 106(1) propagates the bucket values for the various updated access histograms 224 and modification histograms 226 up the directory tree 222. The propagation is required because of the hierarchical structure of the directories in the file system, and corresponding structure of the directory tree 222.

If a bucket value is updated in one of the access histograms 224 or modification histograms 226 for a directory that is a subdirectory, then the corresponding bucket values must be updated for the parent directory as well. In some examples, the propagation can be implemented as described and illustrated in U.S. patent application Ser. No. 17/217, 333, filed Mar. 30, 2021, and entitled "METHODS FOR HIERARCHICAL PROPAGATION IN TREE STRUCTURES AND DEVICES THEREOF," which is incorporated herein by reference in its entirety, although other methods of propagating the recursive properties maintained in the access histograms 224 and modification histograms 226 throughout the directory tree 222 can also be used in other examples.

Referring back to step 312, if the node computing device 106(1) determines that the identified storage operation is not a request to delete an existing file maintained by the file system, then the storage operation does not involve accessing or modifying a file, and the No branch is taken to step 318. In step 318, the node computing device 106(1) determines whether an interactive analytics graphical user interface (GUI) has been requested, such as by an administrator of the storage network, for example. If the node computing device 106(1) determines that an interactive analytics GUI has not been requested, then the No branch is taken back to step 300. However, if the node computing device 106(1) determines that an interactive analytics GUI has been requested, then the Yes branch is taken to step 320.

In step 320, the node computing device 106(1) generates and outputs an interactive analytics GUI configured to generate visualizations responsive to directory selections and using the access histograms 224 and modification histograms 226. The reporting facilitated via the interactive analytics GUI is near real-time since the propagation of the access histograms 224 and modification histograms 226 upward in the directory tree 222 is continuous. Accordingly, the reporting is advantageously relatively current and requires minimal delay to produce. In order to generate the reporting, the histograms can be transformed (e.g., as described and illustrated in detail above with reference to step 406) when required responsive to an analytics request such that the appropriate buckets and associated values for appropriate time intervals are maintained in each of the histograms queried as part of the analytics request.

Figure 6:
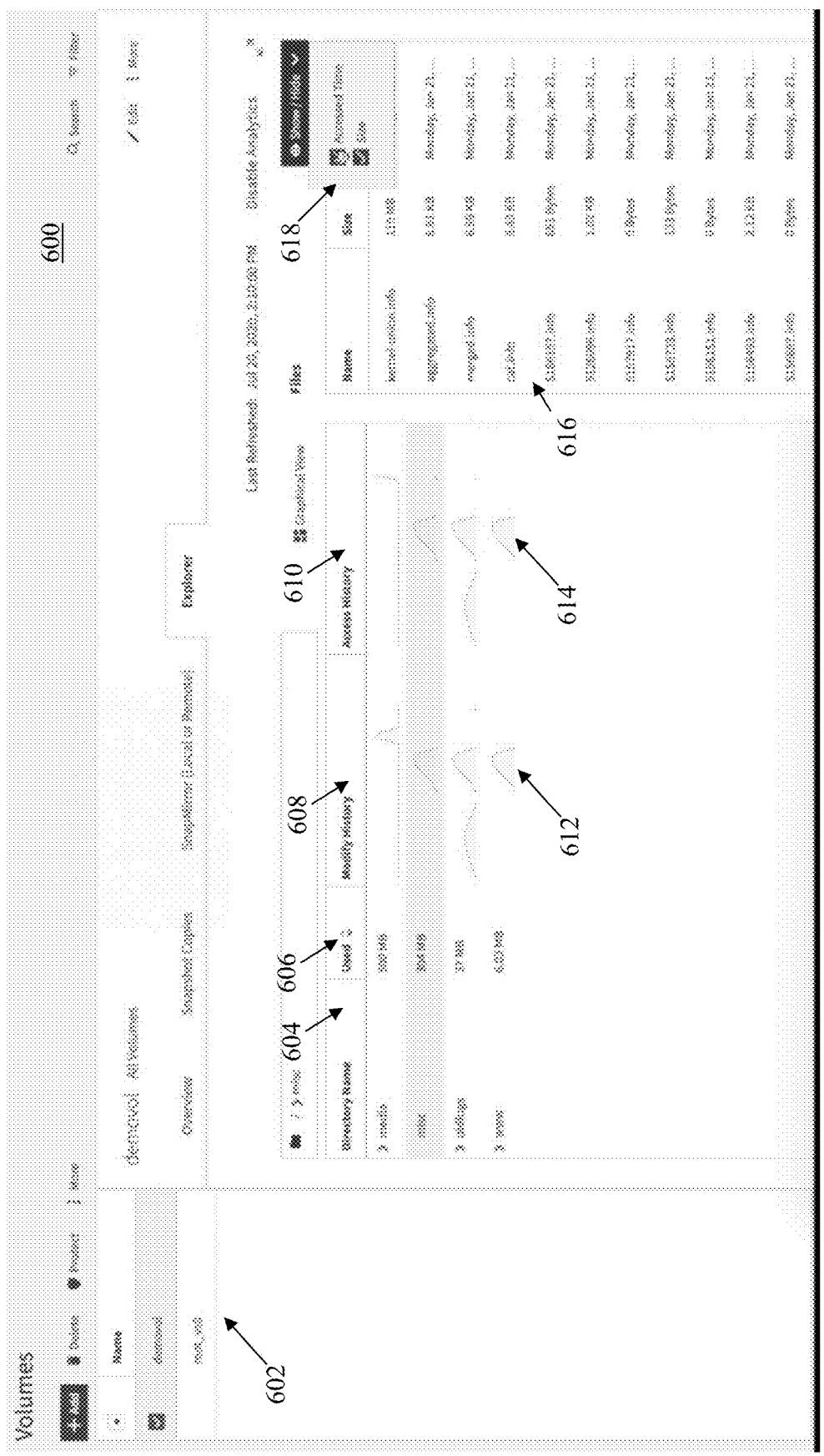
FIG. 6 is a screenshot of an exemplary interactive analytics interface illustrating real-time reporting of directory modification and access history.

Referring to FIG. 6, a screenshot of an exemplary interactive analytics interface 600 illustrating real-time reporting of directory modification and access history is illustrated. In this example, the interactive analytics interface 600 provides volume selections 602. Upon selection of a volume, a directory listing 604 is generated for the directories immediately below the root in the directory tree 222 for the file system maintained in the selected volume. For each directory in the directory listing 600, the used space 606, modification history 608, and access history 610 is displayed. The modification history 608 is displayed via a visualization 612 that is a graph generated using the bucket values for the buckets in one of the modification histograms 226 for each directory. Similarly, the access history 610 is displayed via a graph generated using the bucket values for the buckets in one of the access histograms 224 for each of the directories in the directory listing 604.

Selection of one of the directories in the directory listing 604 of the interactive analytics interface 600 displays a sortable file listing 616. The file listing 616 includes file names, file sizes, and last access times in this example, although other file attributes can be displayed in other examples based on user selections from a show/hide drop-down 618. The last access times for the files in the file listing 616 can be stored and/or maintained as described and illustrated above with reference to step 310 of FIG. 3, step 404 of FIG. 4, and/or step 506 of FIG. 5, for example. In other examples, the last modification times can also be retrieved and displayed in the file listing 616 of the interactive analytics interface 600.

Figure 7:
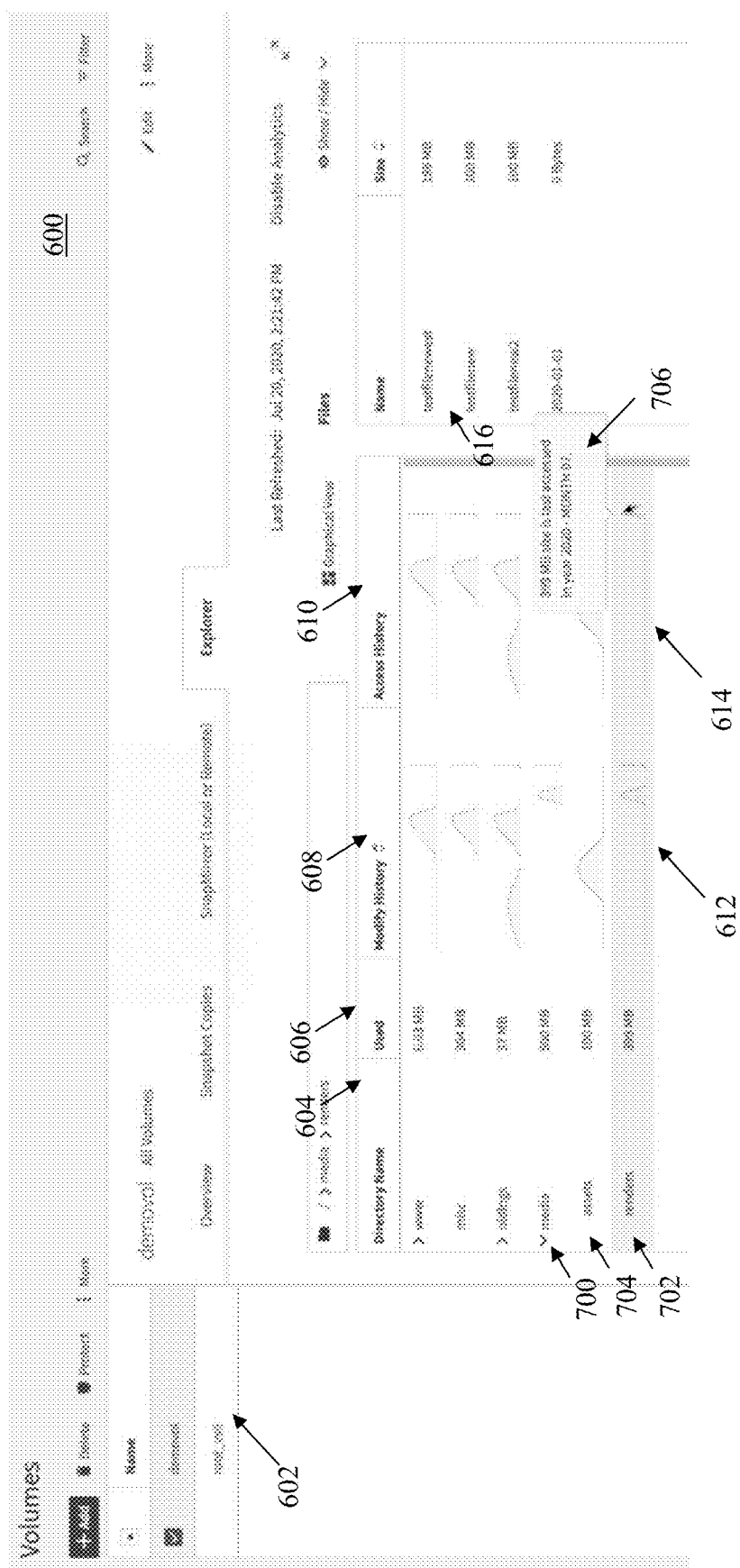
FIG. 7 is a screenshot of the exemplary interactive analytics interface of FIG. 6 illustrating directory selection and drill-down functionality.

Referring to FIG. 7, a screenshot of the exemplary interactive analytics interface 600 of FIG. 6 illustrating directory selection and drill-down functionality is illustrated. In this example, selection of the media directory 700 results in an update to the directory listing 604 to display the subdirectories for the media directory 700, including the renders subdirectory 702 and the assets subdirectory 704 in this example. The modification history 608 and access history 610 also are sortable in this example. Accordingly, a user can sort the directory listing 604 based on the modification history 608 to determine in this example that the media directory 700 was modified most recently.

Even further, by selecting the media directory 700, the user can determine that the renders subdirectory 702, and not the assets subdirectory 704, was modified most recently. Additionally, the user can hover over the access history visualization for the renders subdirectory 702 to generate a display 706 of more information including the total size of the files maintained in the renders subdirectory 702 that was last accessed in the seventh month of the 2020 year. Other information can also be provided in other examples.

Figure 8:
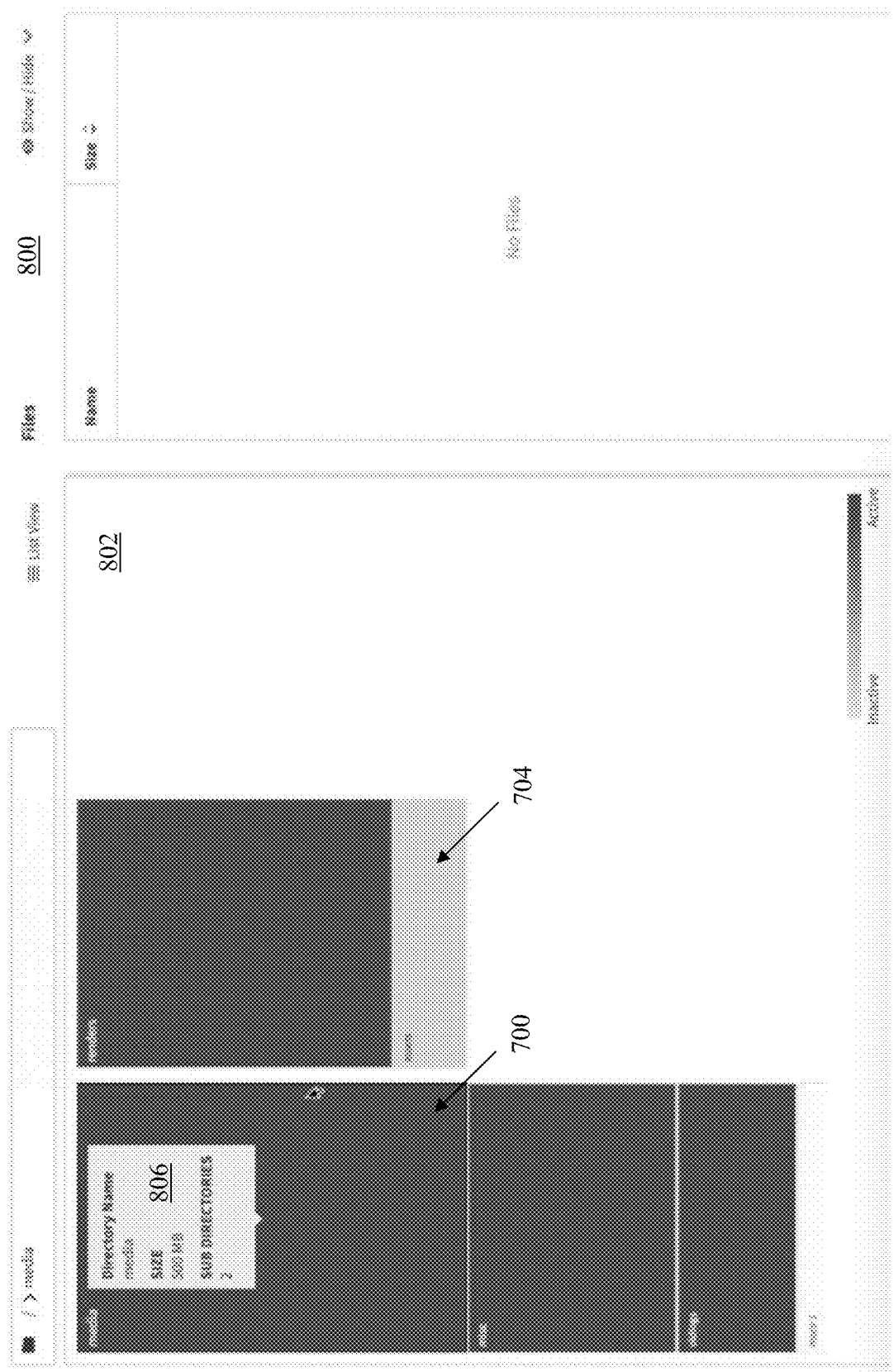
FIG. 8 is a screenshot of another exemplary interactive analytics interface including a heat map illustrating real-time reporting of directory access history.

Referring to FIG. 8, a screenshot of another exemplary interactive analytics interface 800 including a heat map 802 illustrating real-time reporting of directory access history is illustrated. In this example, the heat map 802 provides a different type of visualization, as compared to the graphs of the interactive analytics interface 600, for the modification and/or access history of the directories of the file system. The heat map 802 can include different colors or shading for various boxes or other shapes associated with particular directories that reflect the level of modification and/or access activity associated with the directories. The boxes can be sized to visually provide information, such as larger boxes associated with larger sized directories, for example.

In the particular example illustrated in FIG. 800, the assets directory 704 is colored or shaded to indicate that it is the least active of the illustrated directories. Additionally, hovering over the box for the media directory 700 can provide a display 806 of information including a directory size and a number of subdirectories, for example, although other information can also be provided in other examples. Accordingly, the interactive analytics interfaces 600 and 800 facilitate quick and easy traversal of the directory structure of the file system to identify directories that have been accessed and/or modified most or least recently, for example, and to obtain other analytics reporting information for the file system.

Referring back to FIG. 3, subsequent to outputting an interactive analytics GUI in step 320, the node computing device 106(1) in this example proceeds back to step 300. Additionally, if the node computing device 106(1) determines in step 318 that an interactive analytics GUI has not been requested, then the No branch is taken back to step 300. In other examples, one or more of steps 300-320 can be performed in a different order and/or in parallel.

Additionally, in the particular examples described and illustrated herein, the storage operations include read, write, create, and delete operations, although other types of storage operations can be identified in step 300 in other examples. For example, a set file attributes operation that explicitly updates the access and modification times for a file to values other than the current time without requiring that another storage operation (e.g., read or write operation) occur with respect to the file. In response to such an operation, the node computing device 106(1) uses the time recited in the operation to identify the appropriate buckets in one or more of the access or modification histograms to adjust. Other storage operations can also be used in other examples.

With this technology, histograms are leveraged to facilitate efficient file system analytics reporting regarding accesses and modifications for files stored in particular directories of the file system. Advantageously, directory trees do not have to be rescanned to respond to analytics queries regarding file accesses and modifications and, instead, analytics reporting can be performed in near real-time with reduced resource utilization. Interactive analytics interfaces utilize the histograms to facilitate traversal of the directory structure of a file system and quick identification of access and modification activity levels throughout the directory structure. Accordingly, this technology reduces the performance burden of maintaining and reporting on file system analytics, and thereby improves the functioning of node computing devices in storage networks.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
increasing, by a computing device, a bucket value for one of a plurality of buckets in each of a plurality of histograms associated with a file system directory in a hierarchical directory tree after identifying a storage operation creating a file in the file system directory, wherein the bucket value is increased by a size of the file;
setting, by the computing device, a time value for the file based on a time of the storage operation;
adjusting, by the computing device, the bucket value based on the file size responsive to a subsequent storage operation associated with the file, wherein, after the subsequent storage operation, the one of the buckets is identified based on the set time value; and
outputting, by the computing device, an interactive analytics interface configured to generate, using one or more of the histograms as modified based on the adjusted bucket value, historical activity associated with the file system directory responsive to a selection of the file system directory.

2. The method of claim 1, wherein each of the histograms corresponds to a different time period granularity and overlaps with another of the histograms and the one of the plurality of buckets is a current bucket.

3. The method of claim 1, further comprising discarding, by the computing device, the current bucket after expiration of a plurality of shortest time periods of the different time period granularities, wherein the one of the histograms is associated with the shortest time period.

4. The method of claim 1, wherein the time value comprises one or more of a last access time or a last modification time and the histograms comprise a plurality of access histograms and a plurality of modification histograms.

5. The method of claim 4, further comprising increasing, by the computing device, the bucket value for the one of the buckets in each of the access histograms or each of the modification histograms after determining that the subsequent storage operation comprises an access or a modification of the file, respectively.

6. The method of claim 1, further comprising propagating, by the computing device, the increased bucket value up the hierarchical directory tree.

7. The method of claim 1, wherein the adjusting further comprises decreasing, by the computing device, the bucket value responsive to the subsequent storage operation, wherein the subsequent storage operation comprises a deletion, read, or write operation.

8. A non-transitory machine readable medium having stored thereon instructions for facilitating efficient file system directory analytics comprising machine executable code that, when executed by at least one machine, causes the machine to:

retrieve a last access time for a file after a request to read the file from a file system directory;

identify, based on the last access time, a historical bucket of a plurality of buckets in each of a plurality of histograms associated with the file system directory in a hierarchical directory tree;

adjust a bucket value based on a file attribute for each of the identified historical buckets and a current bucket of the buckets in each of the histograms, wherein the bucket value for each of the identified historical buckets is decreased by a size of the file and the bucket value for the current bucket is increased by the size of the file;

update the last access time based on a time of the read request; and generate, and output, using one or more of the histograms, an access history for the file system directory.

9. The non-transitory machine readable medium of claim 8, wherein each of the histograms corresponds to a different time period granularity and overlaps with another of the histograms.

10. The non-transitory machine readable medium of claim 8, wherein the machine executable code, when executed by the machine, further causes the machine to discard the current bucket after expiration of a plurality of shortest time periods of the different time period granularities, wherein the one of the histograms is associated with the shortest time period.

11. The non-transitory machine readable medium of claim 8, wherein the machine executable code, when executed by the machine, further causes the machine to propagate the adjusted bucket value up the hierarchical directory tree.

12. A computing device, comprising:

a memory containing machine readable medium comprising machine executable code having stored thereon instructions for facilitating efficient file system directory analytics; and a processor coupled to the memory, the processor configured to execute the machine executable code to cause the processor to:

identify, after a request to write to a file stored in a file system directory, a historical bucket of a plurality of buckets in each of a plurality of histograms associated with the file system directory in a hierarchical directory tree, wherein the historical bucket is identified based on a stored last modification time for the file;

adjust, based on a file attribute for the file, a first bucket value for the historical bucket and a second bucket value for a current bucket of the buckets in each of the histograms, wherein the first bucket value is decreased by a first size of the file prior to the write request and the second bucket value is increased by a second size of the file as modified by the write request;

update the stored last modification time based on a time of the write request; and generate, and output, using one or more of the histograms, a modification history for the file system directory.

13. The computing device of claim 12, wherein one or more of the first size or the second size comprises a number of blocks associated with the file.

14. The computing device of claim 12, wherein each of the histograms corresponds to a different time period granularity and overlaps with another of the histograms.

15. The computing device of claim 12, wherein the processor is further configured to execute the machine executable code to further cause the processor to discard the current bucket after expiration of a plurality of shortest time periods of the different time period granularities, wherein the one of the histograms is associated with the shortest time period.

16. The computing device of claim 12, wherein the processor is further configured to execute the machine executable code to further cause the processor to propagate the adjusted bucket value up the hierarchical directory tree.

* * * * *